March 1, 1955  R. CARTER  2,702,977
MOWING MACHINE HAVING ROTATING CUTTING DISK TYPE CUTTER
Filed Oct. 4, 1950  2 Sheets-Sheet 1

Inventor
Hazel Carter
Raymond Hugh Carter
Administrators of the
Estate of
Raymond Carter, Decd.

By

March 1, 1955  R. CARTER  2,702,977
MOWING MACHINE HAVING ROTATING CUTTING DISK TYPE CUTTER
Filed Oct. 4, 1950  2 Sheets-Sheet 2
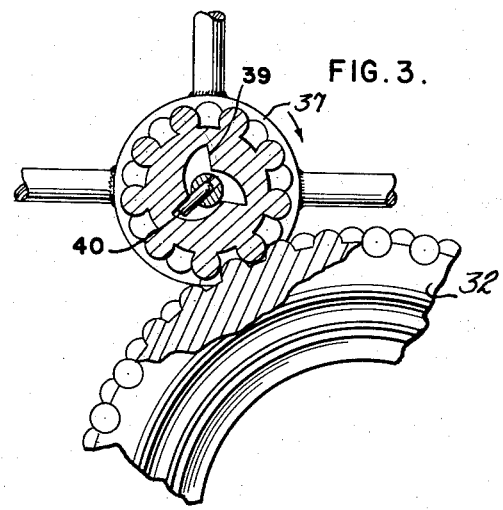
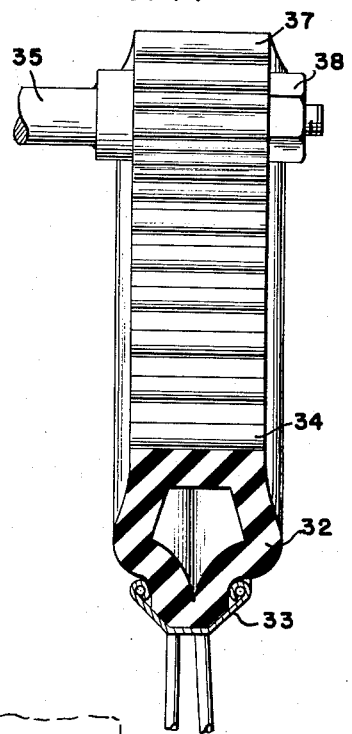
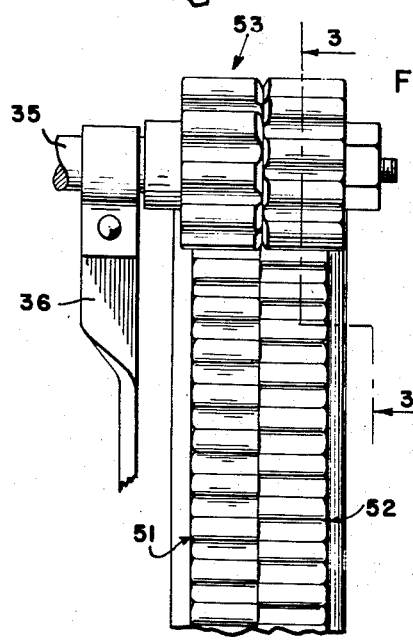
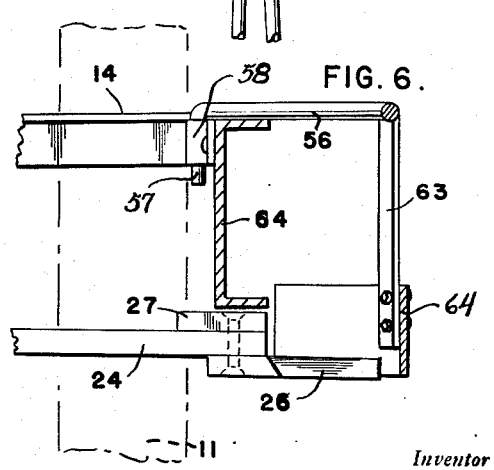
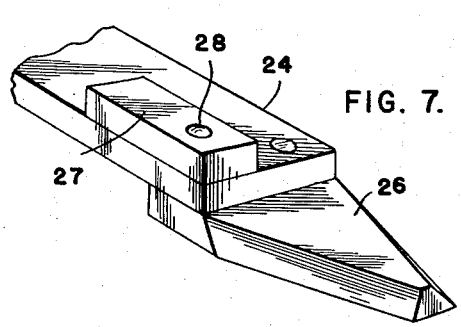
Inventor
Hazel Carter
Raymond Hugh Carter
Administrators of the
Estate of
Raymond Carter, Dec'd
By United States Patent Office 2,702,977
Patented Mar. 1, 1955

2,702,977

MOWING MACHINE HAVING ROTATING CUTTING DISK TYPE CUTTER

Raymond Carter, deceased, late of Wyoming, Ill., by Hazel Carter, Wyoming, and Raymond Hugh Carter, Chicago, Ill., administrators, assignors to Hotchkiss Steel Products Company, Bradford, Ill., a corporation of Illinois Application October 4, 1950, Serial No. 188,373

2 Claims. (Cl. 56—25.4)

This invention relates to mowing machines, especially mowing machines which may be used to cut weeds along relatively inaccessible areas and is an improvement of the mowing machines disclosed in the inventor's co-pending applications Serial No. 18,272, now Patent 2,529,328 granted November 7, 1950, and Serial No. 156,897, now Patent 2,627,156 granted February 3, 1953, filed March 31, 1948, and April 19, 1950, entitled "Mowing Machine" and "Cutting Bar for Mowing Machines," respectively.

Broadly, the mowing machine includes a frame having ground wheels, a mandrel supported by the frame, a cutting blade fixed to the mandrel for rotation about a vertical axis, an arcuate guard suitably affixed to the frame and extending forwardly of the mandrel, the mandrel being disposed eccentrically with respect to the guard, adjustable runners operatively connected with the guard, a power plant on the frame, a drive connection between the power plant and the mandrel to impart rotational movement to the mandrel, and a further drive connection between the power plant and the ground wheels to turn the ground wheels.

Among the important objects of the present invention are the following:

1. The provision of a positive drive connection between the power plant and the ground wheels which includes a pair of gears supported by the frame, each gear being in mesh with a gear-like tread on the ground wheel whereby the activation of the power plant will simultaneously impart rotary movement to the wheels.

2. The provision of a cutting bar which is eccentrically mounted with respect to the guard in order that the weeds will be properly moved out of the path of the machine during the cutting process.

3. The provision of a cutting bar support for the cutting blade wherein each support includes a reinforced element on the leading edge thereof adjacent the point of attachment of the blade to the support.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:

Figure 3 is a sectional view taken along the line 3—3 of Figure 5, the view looking in the direction of the arrows.

Figure 4 is an enlarged end view, partly in section, showing a modified form of tire tread and pinion for providing a positive drive connection to the ground wheels.

Figure 5 is an enlarged end view partly broken away illustrating the preferred type of tire tread and pinion for effecting the positive drive to the ground wheel.

Figure 6 is a sectional view taken along the line 6—6 of Figure 2, the view being on a somewhat enlarged scale, and Figure 7 is a perspective view partly broken away of one of the cutting blades and the support therefor, showing the deflector lug carried by the leading edge of the cutter blade support.

Figure 1:
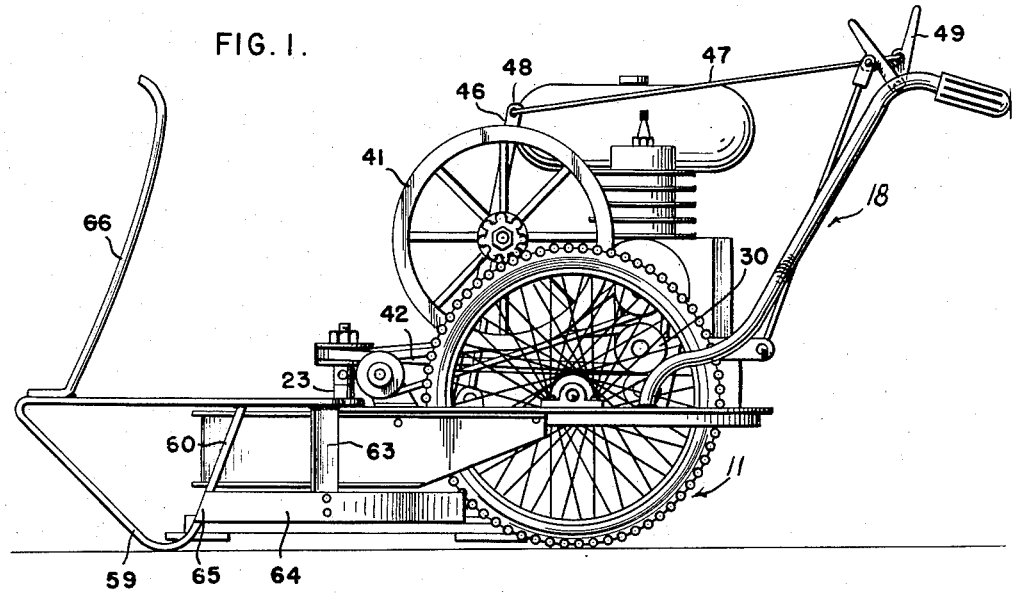
Figure 1 is a view in side elevation of the mowing machine, the machine being adjusted for cutting grass.
Figure 2:
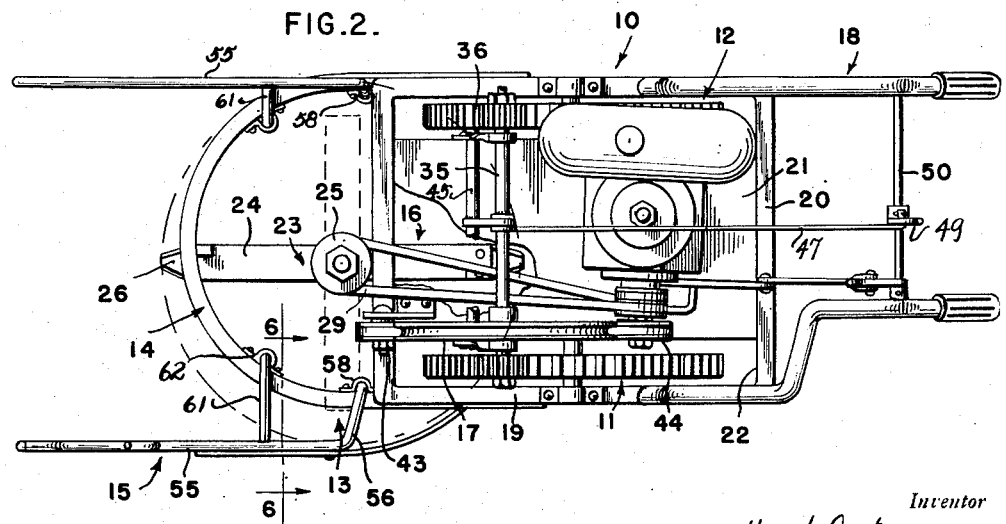
Figure 2 is a top plan view of the machine shown in Figure 1.

Viewing the machine broadly and as perhaps best shown in Figures 1 and 2, it comprises a frame 10, ground wheels 11 independently journalled in the frame intermediate the ends thereof, a power plant 12 mounted on the frame, a cutting assembly 13 at the forward end of the frame, an arcuate guard 14 fixed to the frame and extending forwardly of the cutting assembly, vertically adjustable runners or shoes 15 carried by the guard, a drive connection 16 between the power plant 12 and the cutting assembly 13, a second drive connection 17 between the power plant and the ground wheels 11, and an adjustable handle construction 18 extending rearwardly of the frame 10.

The frame 10 preferably comprises parallel longitudinal supporting bars 19 the ends of which are connected to transverse bars 20, and a platform 21 extends between the transverse bars 20, although the platform is of lesser width than the bars 20 to provide slotted areas 22 between the longitudinal edges of the platform and the bars 19 for receiving the ground wheels 11. The ground wheels 11 are individually journalled and are capable of vertical adjustments, and inasmuch as this adjustable connection is disclosed in my co-pending application Serial No. 18,272 filed March 31, 1948, now Patent 2,529,328, it is thought unnecessary to specifically describe this particular structure.

The cutting assembly 13 includes a vertically disposed mandrel 23 which is secured to the forward transverse bar 20, the mandrel supporting a blade bar 24 at the lower end thereof and a pulley 25 at the upper end. The mandrel 23 is similar in structural detail to that shown in my co-pending application Serial No. 18,272, now Patent 2,529,328, although it will be noted that the mandrel is mounted eccentrically with respect to the arcuate guard 14, the purpose of which will later be more fully described. The cutter bar 24 supports a detachable blade or cutting section 26 at each outer end thereof, as shown in Figure 7, and the detachable cutting section is covered in my co-pending application Serial No. 156,897 filed April 19, 1950, now Patent 2,627,156. However, it will be noted that a lug or the like 27 is attached, as indicated at 28, to the leading edge of the bar 24 immediately behind the blade 26. The lug 27 which functions as a deflector tends to drive the cuttings to the right of the operator (Figure 2), thus spreading the cuttings uniformly over areas previously cut. This bar, therefore, prevents the cuttings from twining on the cutter bar or mandrel and thus clears the travel path in which the ground wheels 11 will follow with least resistance. The lug 27 may be said to work on the same principle as the drag tooth in a saw, namely removing the portion that has been cut off.

By mounting the cutting assembly 13 eccentrically with respect to the guard 14, the cutting section 26 during rotation will pass to the outside of the guard 14 from the left of the guard and will gradually disappear or move within the guard 14 as it approaches the right side of the guard, which arrangement will likewise lay aside cuttings and prevent the cuttings from wrapping on the cutting assembly or the mandrel 23.

To impart the necessary rotary movement to the pulley 25 or the mandrel 23, a belt 29 is trained around the pulley and a second pulley 30 supported by the drive shaft of the power plant 12. In order to permit the power plant 12 to be started or the machine propelled along the terrain, an idler pulley assembly may be employed.

To enable the machine to be self-propelled, it will be observed that the wheel 11 comprises a semi-solid resilient tire 32 carried by a rim 33, and the periphery of the tire is provided with spaced arcuate cross ribs 34 which are co-extensive with the periphery of the tire. These cross ribs not only afford great traction in wet or damp grass and loose soil, but also form a part of the positive drive connection to the wheels. A horizontally disposed shaft 35 is journalled in brackets 36 carried by the platform 21 at a point forwardly of the power plant 12. A drive pinion 37 is detachably connected to the outer end of the shaft 35, as indicated at 38, and the teeth of each pinion mesh with the cross ribs 34 on the tire. Each pinion is provided with an internal ratchet, indicated 39 (Figure 3) which works against a simple pawl 40 within the shaft 35. However, because of the loose pawl 40, either wheel is free to turn faster than the driving speed of the pinion 37. It is possible to shift from a dual to a single wheel drive by merely removing one of the pawls 40 from its pinion 37. A single wheel drive will permit the easiest maneuvering of the machine for ordinary work, while the dual wheel drive is preferably for working to and fro on heavy slopes in loose soil and under unusual conditions.

In order to impart rotary movement to the drive shaft 35, it will be seen that a wheel 41 is suitably secured to the shaft 35 preferably adjacent to the left hand pinion and the periphery of the wheel is grooved to engage a belt 42 trained over a pulley 43 secured to the platform 21 near the front end of the machine and over pulley 44 operatively connected with the drive shaft of the power plant 12. In order to move the drive pinions 37 out of mesh with the cross ribs 34 on the tires, it will be noted that a laterally extending shaft 45 is connected at each end to the brackets 36 and that an arm 46 extends upwardly thereform. A push-pull rod 47 is pivoted at one end to the arm, as indicated at 48, and the opposite end of the rod is connected to an operating lever 49 mounted on a cross tube 50 extending between the handles 18. Manifestly, by moving the lever 49 forwardly, the rod 47 will likewise move the arm 46 in the same direction and, as a consequence, rock the brackets 36 about their pivots, thus disengaging the drive pinions 37 from the tires 32. Of course, movement of the lever 49 in the opposite direction will effect meshing of the pinions and the cross ribs 34. The engagement or disengagement of the drive pinions to provide the positive drive to the wheels 11 can therefore be very easily and quickly accomplished by the operator of the machine from his position at the rear of the machine.

In Figure 5 I have shown another type of drive connection wherein the periphery of the tire is provided with two sets of cross ribs 51 and 52, and it can be seen that the cross ribs are located in staggered relationship and drive pinion 53 has its teeth formed in a similar manner. The advantage of this arrangement over that shown in Figure 4 increases the number of ribs or teeth on the tire which are in constant mesh with the drive pinion. Otherwise, the construction functions in a similar manner to that illustrated in Figure 4.

The drive connection 17 also has the advantage of greatly increasing the tire traction when operating in snow, ice, mud and loose soils which, of course, is of great importance. Furthermore, the positive mesh between the pinions and the tires will greatly prolong the life of the tire, and the type of tire used requires no inflation.

The runners or shoes 15 previously described comprise a substantially horizontally extending rod member 55 which is provided with an angular extension 56 at the rear end thereof, the extension 56 terminating in a downturned portion 57 adapted to be adjustably secured within a sleeve 58 suitably secured to the inner face of the arcuate guard 14. The rod member 55 at the left hand side of the machine is bent to form a substantially triangular shaped depending portion 59 which is adapted to engage the ground or the terrain being traversed. Leg 60 of the triangular portion 59 may be welded or brazed to the horizontally extending member 55 and terminates in a horizontal element 61, which element is adapted to be lodged in a sleeve 62 carried by the guard 14, the sleeve 62 being similar to the sleeve 58. Consequently, it is apparent that shoes 15 may be adjusted vertically to regulate the position of the cutting bar 24 relative to the ground.

As perhaps more clearly shown in Figure 2, the rod member 55 is spaced outwardly with respect to the frame by virtue of the members 56 and 61 to provide means for supporting a guard for the cutting blade. Referring to Figures 1 and 6, it will be noted that a strap 63 is welded to the rod 55 adjacent the angular extension 56 and extends downwardly therefrom. A shield 64 is suitably attached intermediate the ends thereof with the strap 63 and at its forward end is connected to the leg 60, as indicated at 65. This arrangement serves as a fence guard, so to speak, and permits the machine to mow closely along fences or other obstructions without the danger of the blade being injured.

The rod-like member 55 along the right hand side of the machine is generally similar to that along the left side, with the exception that the extensions 56 and 61 are of lesser length, since the rod member 55 need not be spaced outwardly with respect to the machine frame. In lieu of the triangular portion 59, excellent results may be achieved by merely bending the front end of the rod inwardly at an angle and thence upwardly to form a ground-engaging portion. In other words, the leg 60 is not necessary, since a shield 64 need not be employed along the right side of the machine. In order to guide the weeds to the right side of the machine, a guiding bar 66 is secured to the forward end of the left hand rod member 55 and curves upwardly and rearwardly across the machine and terminates at a point beyond the right hand rod member 55.

The handle structure 18 is substantially identical to that disclosed in my co-pending application Serial No. 18,272 filed March 31, 1948, now Patent 2,529,328, and the handles are, of course, adjustable. Furthermore, the left handle member is located inwardly with respect to the side of the frame to enable the operator to mow closely along fences and other obstructions without injuring his hand.

In lieu of using two belts, namely the belts 29 and 42, to turn the mandrel and the wheel 41, it is to be understood that a single belt may be employed to drive both the aforementioned members.

It will be appreciated, therefore, that the present mowing machine may be easily adjusted to cut weeds and grass of varying heights by merely making the required adjustment of the runners and the ground wheels which can be effected in a minium of time. The cut material is moved to the side of the machine to form windows, and by virtue of the guard and the blade shield, there is little likelihood of weeds or grass becoming entangled around the cutter bar mandrel of the blade per se being damaged. The positive drive connection permits the machine to be self-propelled and the drive pinions may be moved out of mesh with the ground wheels by merely rocking the drive pinion supports about their pivots to the machine. The assembly includes relatively few essential working parts, thus making the cost of manufacture relatively low, and the machine may be repaired easily and at little expense to the owner.

The invention is not to be confined to any strict conformity with the showing in the drawing but may be changed or modified so long as such changes or modifications mark no material departure from the salient features of the invention as expressed in the appended claims.

What is claimed is:

1. A mowing machine comprising a frame defined by a pair of spaced apart longitudinal members and a transverse member at each end thereof connecting such longitudinal members, a ground wheel journaled in each longitudinal member adjacent the rear end of such member, a vertically disposed arcuate guard secured at the ends thereof to the longitudinally extending members and extending forwardly of the front transverse member, a ground engaging shoe for each side of the forward end of the frame, complemental means on each shoe and the arcuate guard to mount the shoe for vertical adjustment relative to the guard, at least one of the said shoes including means to space such shoe outwardly of the longitudinal member, a vertically disposed mandrel rotatably supported by the front transverse member to one side of the longitudinal center line of the frame whereby such mandrel is eccentrically mounted with respect to the said arcuate guard, a horizontally disposed cutter blade supported by the lower end of the mandrel, a power plant carried by the frame, and a drive connection between the power plant and the mandrel to impart rotary movement to the cutting blade.

2. A mowing machine as defined in and claimed by claim 1 further characterized in that a second drive connection is provided between the power plant and the ground wheels to rotate such wheels.

References Cited in the file of this patent

UNITED STATES PATENTS

| | | |
|---|---|---|
| 1,950,472 | Bowers | Mar. 13, 1934 |
| 2,461,479 | Moffat | Feb. 8, 1949 |
| 2,466,620 | Swift et al. | Apr. 5, 1949 |
| 2,478,558 | Beranek et al. | Aug. 9, 1949 |
| 2,491,768 | Roof | Dec. 20, 1949 |
| 2,517,405 | Moss | Aug. 1, 1950 |
| 2,529,328 | Carter | Nov. 7, 1950 |
| 2,545,074 | Dielschneider | Mar. 13, 1951 |
| 2,552,951 | Freeman | May 15, 1951 |
| 2,576,886 | McCoy | Nov. 27, 1951 |